United States Patent
Kundu et al.

(10) Patent No.: US 9,940,761 B2
(45) Date of Patent: Apr. 10, 2018

(54) SELF-DRIVING VEHICLE SENSOR FAULT REMEDIATION

(71) Applicant: International Business Machines Corporation, Armonk, NY (US)

(72) Inventors: Ashish Kundu, Elmsford, NY (US); Amit A. Nanavati, Bangalore (IN); Clifford A. Pickover, Yorktown Heights, NY (US); Komminist S. Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/226,217

(22) Filed: Aug. 2, 2016

(65) Prior Publication Data
US 2018/0040171 A1 Feb. 8, 2018

(51) Int. Cl.
*G07C 5/00* (2006.01)
*G07C 5/08* (2006.01)
(Continued)

(52) U.S. Cl.
CPC ............ *G07C 5/008* (2013.01); *B64C 39/024* (2013.01); *G05D 1/0248* (2013.01);
(Continued)

(58) Field of Classification Search
CPC ............................. G07C 5/008; B64C 39/024
See application file for complete search history.

(56) References Cited

U.S. PATENT DOCUMENTS 6,128,555 A * 10/2000 Hanson ............... B64G 1/24
244/158.1
6,665,262 B1 * 12/2003 Lindskog ............ H04L 41/0631
370/216
(Continued)

FOREIGN PATENT DOCUMENTS

WO 2015151055 A1 10/2015

OTHER PUBLICATIONS

Bunch, K. Highway Lights Throughout Area to be Repaired, Replaced, Dec. 16, 2015, http://www.candgnews.com/news/highway-lights-throughout-area-be-repaired-replaced-88805.
(Continued)

*Primary Examiner* — Alex C Dunn
(74) *Attorney, Agent, or Firm* — Ryan, Mason & Lewis, LLP

(57) ABSTRACT

Methods, systems, and computer program products for self-driving vehicle sensor fault remediation are provided herein. A computer-implemented method includes detecting a fault in one or more sensors of a self-driving vehicle; determining a remedial action in response to the detected fault, wherein said determining comprises (i) comparing the fault to a database comprising (a) historical sensor fault information and (b) sensor fault remedy information, and (ii) analyzing one or more items of contextual information pertaining to the location of the self-driving vehicle; generating a signal comprising one or more instructions pertaining to carrying out the determined remedial action; and outputting the generated signal to one or more remote-controlled pilotless airborne devices configured to remotely carry out the determined remedial action on the self-driving vehicle.

19 Claims, 3 Drawing Sheets

(51) Int. Cl.
  *G05D 1/02* (2006.01)
  *B64C 39/02* (2006.01)
(52) U.S. Cl.
  CPC ......... *G05D 1/0255* (2013.01); *G05D 1/0257* (2013.01); *G05D 1/0274* (2013.01); *G05D 1/0278* (2013.01); *G07C 5/0808* (2013.01); *B64C 2201/126* (2013.01); *B64C 2201/146* (2013.01)

(56) References Cited

U.S. PATENT DOCUMENTS

| | | | | |
|---|---|---|---|---|
| 7,219,013 | B1* | 5/2007 | Young | G01C 21/165 |
| | | | | 342/357.58 |
| 7,421,321 | B2* | 9/2008 | Breed | B60C 11/24 |
| | | | | 340/442 |
| 8,145,444 | B1* | 3/2012 | Bickford | G05B 23/0235 |
| | | | | 702/179 |
| 8,738,198 | B2* | 5/2014 | Schempf | B25J 11/002 |
| | | | | 701/2 |
| 8,930,133 | B2* | 1/2015 | Wurman | G06Q 10/08 |
| | | | | 414/334 |
| 9,221,396 | B1 | 12/2015 | Zhu et al. | |
| 9,268,335 | B2 | 2/2016 | Taira et al. | |
| 9,274,525 | B1 | 3/2016 | Ferguson et al. | |
| 9,519,284 | B2* | 12/2016 | Wurman | |
| 9,684,836 | B1* | 6/2017 | Ferguson | G06K 9/00798 |
| 2004/0128039 | A1* | 7/2004 | Podowski | G07C 5/008 |
| | | | | 701/33.4 |
| 2005/0004723 | A1* | 1/2005 | Duggan | G05D 1/0061 |
| | | | | 701/24 |
| 2005/0096800 | A1* | 5/2005 | Tanielian | B64C 39/024 |
| | | | | 701/2 |
| 2007/0288156 | A1* | 12/2007 | Neff | F41G 7/343 |
| | | | | 701/533 |
| 2009/0043441 | A1* | 2/2009 | Breed | G06K 7/10178 |
| | | | | 701/31.9 |
| 2009/0228738 | A1* | 9/2009 | Michaelson | G06F 11/2025 |
| | | | | 714/4.1 |
| 2014/0149806 | A1* | 5/2014 | Khalastchi | G06K 9/00496 |
| | | | | 714/49 |
| 2014/0309891 | A1* | 10/2014 | Ricci | H04W 48/04 |
| | | | | 701/48 |
| 2015/0266490 | A1* | 9/2015 | Coelingh | B60W 50/082 |
| | | | | 701/30.5 |
| 2016/0025403 | A1* | 1/2016 | Krainer | F25D 21/02 |
| | | | | 62/81 |
| 2016/0217627 | A1* | 7/2016 | Khalaschi | G07C 5/0808 |
| 2017/0011333 | A1* | 1/2017 | Greiner | G06Q 10/083 |
| 2017/0069208 | A1* | 3/2017 | Nair | G01C 21/3415 |
| 2017/0193828 | A1* | 7/2017 | Holtzman | G08G 5/0069 |

OTHER PUBLICATIONS

Routescene, UAV LidarPod, Jul. 30, 2016, http://www.routescene.com/products/product/uav-lidarpod/.

Frtunikj et al. Adaptive Error and Sensor Management for Autonomous Vehicles: Model-Based Approach and Run-time System, In 4th International Symposium on Model Based Safety Assessment, 2014.

Hartman, Autonomous Driving: Developing Failsafe Systems and Smart Sensor Technology to Improve Safety, Oct. 2013.

Kim et al., Towards Dependable Autonomous Driving Vehicles: A System-Level Approach, Feb. 2013.

* cited by examiner

SELF-DRIVING VEHICLE SENSOR FAULT REMEDIATION

FIELD

The present application generally relates to information technology, and, more particularly, to self-driving vehicle technology.

BACKGROUND

A self-driving vehicle (SDV) includes an array of sensors, and may or may not have a human passenger. However, even with a passenger, the passenger may not be able to take the necessary actions to address a sensor that fails as the SDV is travelling.

SUMMARY

In one embodiment of the present invention, techniques for self-driving vehicle sensor fault remediation are provided. An exemplary computer-implemented method can include steps of detecting a fault in one or more sensors of a self-driving vehicle; determining a remedial action in response to the detected fault, wherein said determining comprises (i) comparing the fault to a database comprising (a) historical sensor fault information and (b) sensor fault remedy information, and (ii) analyzing one or more items of contextual information pertaining to the location of the self-driving vehicle; generating a signal comprising one or more instructions pertaining to carrying out the determined remedial action; and outputting the generated signal to one or more remote-controlled pilotless airborne devices configured to remotely carry out the determined remedial action on the self-driving vehicle.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes SDV sensor fault remediation. At least one embodiment of the invention includes detecting a fault associated with one or more sensors of an SDV, and based on the detection, triggering a mobile amelioration action that employs a remote-controlled pilotless airborne device to the SDV to implement a remedial action. As used herein, a "remedial action" can include a corrective or a non-corrective action.

Figure 1:
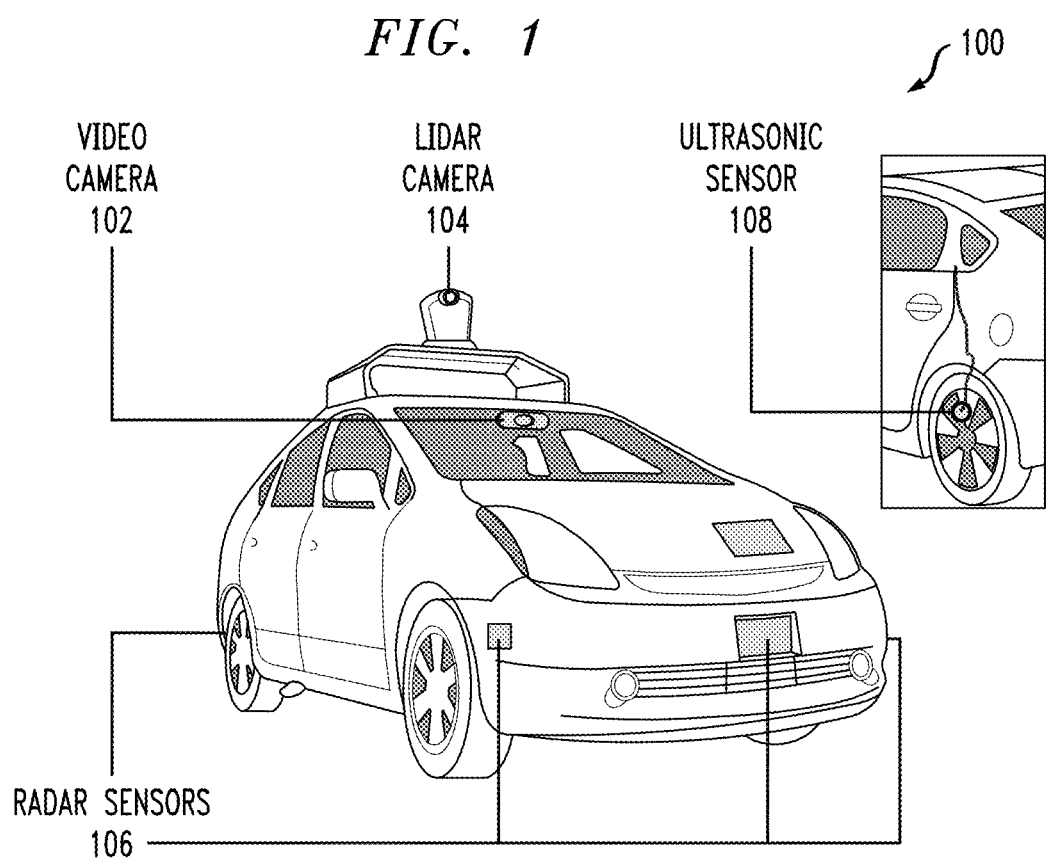
FIG. 1 is a diagram illustrating an example SDV, according to an exemplary embodiment of the invention.

FIG. 1 is a diagram illustrating an example SDV 100, according to an exemplary embodiment of the invention. By way of illustration, FIG. 1 depicts a rotating LIDAR camera 104, which includes a laser range finder that can create three-dimensional (3D) images of objects, helping the SDV observe potential hazards and/or navigational landmarks. Additionally, the LIDAR camera 104 can calculate how far an object is from the moving SDV based on the time that it takes for the laser beam(s) (of the LIDAR camera 104) to hit the object and return.

Also, FIG. 1 depicts sensors 106 (for example, radar sensors) mounted on the SDV's front and rear bumpers that enable the SDV to be aware of vehicles in front of and behind the SDV. Exemplary radar sensors 106 can utilize an object-detection system that uses radio waves to determine the range, angle, and/or velocity of objects. Additionally, FIG. 1 depicts a video camera 102 (or image sensor) installed in and/or on the SDR (for example, inside the front windshield), which, with the help of image processing and artificial intelligence, can interpret common road behavior and motorist signs. For example, if a cyclist gestures that she intends to make a turn, the SDV, via the assistance of the video camera 102, can interpret such a gesture correctly and slow down to allow the cyclist to turn.

Further, FIG. 1 additionally depicts an ultrasonic sensor 108 that can be positioned on one of the rear wheels and which uses sound propagation to detect objects (and alert the SDV regarding potential objects) and monitor the movements of the SDV. Such a sensor 108 can also calculate the number of rotations of the wheel to determine the exact location of the SDV with the help of a global positioning system (GPS) and a map service or application.

In one or more embodiments of the invention, predetermined shape and motion descriptors can be programmed into the operating system of the SDV to help the SDV make intelligent decisions using components such as depicted in FIG. 1. Additionally, all data sensed and/or collected by the above-detailed sensors can be stored locally in the SDV and/or in a cloud infrastructure. Such data can be used by various algorithms (neural networks, deep learning, etc.) to generate learning models.

Figure 2:
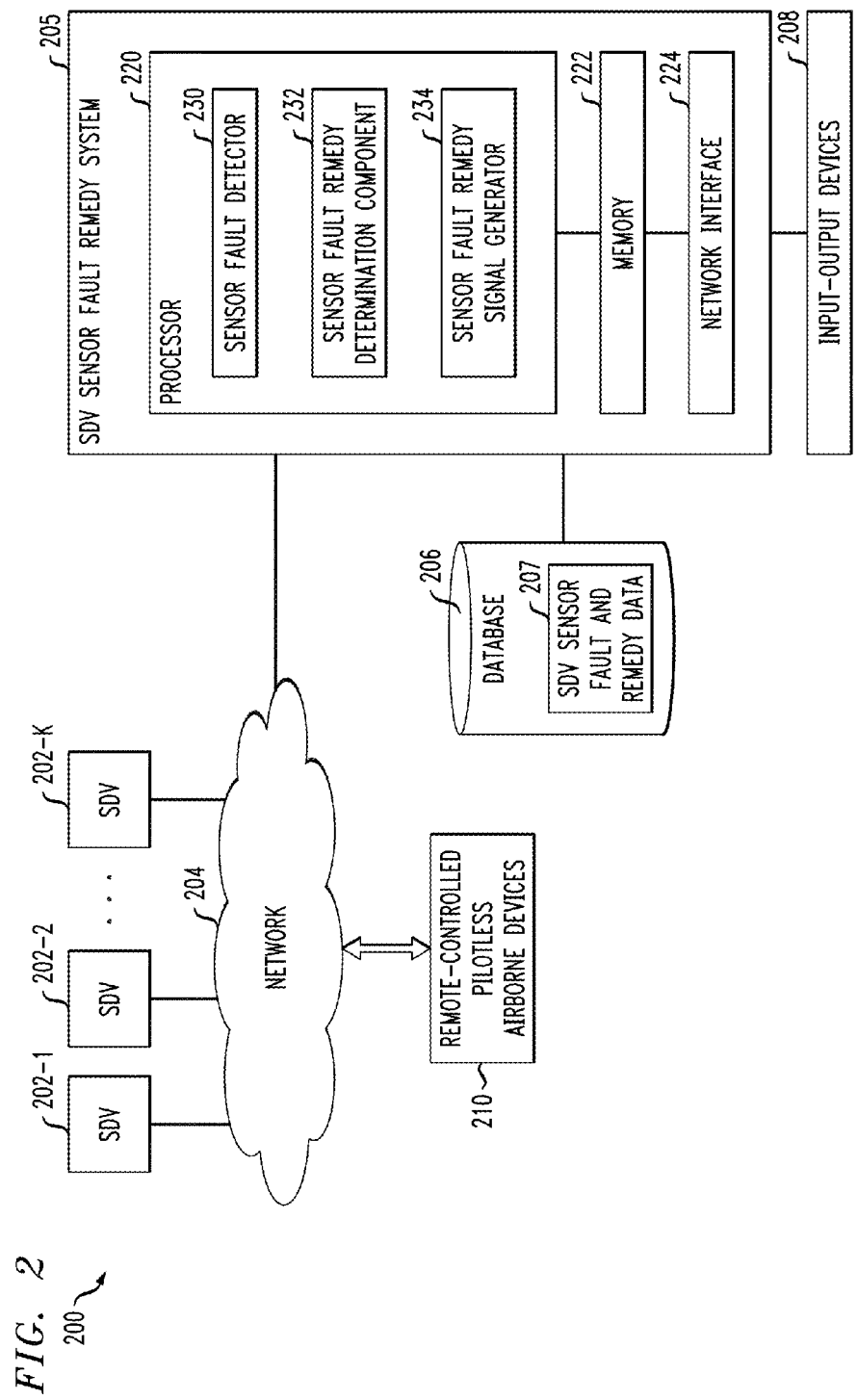
FIG. 2 is a block diagram of a computer network configured for addressing sensor failures on SDVs in an illustrative embodiment of the invention.

FIG. 2 is a block diagram of a computer network configured for addressing sensor failures on SDVs in an illustrative embodiment of the invention. By way of illustration, FIG. 2 depicts a computer network 200 configured in accordance with an illustrative embodiment of the invention. The computer network 200 comprises a plurality of SDVs 202-1, 202-2, . . . 202-K, collectively referred to herein as SDVs 202. The SDVs 202 are coupled to a network 204, where the network 204 in this embodiment is assumed to represent a sub-network or other related portion of the larger computer network 200. Accordingly, elements 200 and 204 are both referred to herein as examples of "networks" but the latter is assumed to be a component of the former in the context of the FIG. 2 embodiment. Also coupled to the network 204 is a SDV sensor fault remedy system 205.

The network 204 is assumed to comprise a portion of a global computer network such as the Internet, although other types of networks can be part of the computer network 200, including a wide area network (WAN), a local area network (LAN), a satellite network, a telephone or cable network, a cellular network, a wireless network such as a Wi-Fi™ or WiMAX network, or various portions or combinations of these and other types of networks. The computer network 200 in some embodiments therefore comprises combinations of multiple different types of networks each comprising processing devices configured to communicate using internet protocol (IP) or other related communication protocols.

The SDV sensor fault remedy system 205 has an associated database 206 configured to store data characterizing remedies for each of a plurality of SDV sensor faults, as well as data pertaining to a collection of one or more remote-controlled pilotless airborne devices used in connection with SDV fault remedies. The database 206 more particularly stores SDV sensor fault data (such as types of sensors, manufacturing details, types of faults and/or characteristics, root causes associated with faults, maintenance history, etc.) and remedy data 207.

The database 206 in the present embodiment is implemented using one or more storage systems associated with the SDV sensor fault remedy system 205. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the SDV sensor fault remedy system 205 are input-output devices 208, which illustratively comprise keyboards, displays or other types of input-output devices in any combination. Such input-output devices are used to support one or more user interfaces to the SDV sensor fault remedy system 205, as well as to support communication between the SDV sensor fault remedy system 205 and other related systems and devices not explicitly shown.

In the present embodiment, alerts generated by the SDV sensor fault remedy system 205 are provided over the network 204 to one or more remote-controlled pilotless airborne devices 210. Such devices can include processing devices configured for communication over network 204 with the SDV sensor fault remedy system 205. Further, such devices may comprise automated entities, such as hardware, software or firmware entities running on a processing device.

In one or more embodiments of the invention, multiple types of remote-controlled pilotless airborne devices 210 can be used that collaboratively repair and/or replace sensors, with specialization for different activities. For example, a first replacement remote-controlled pilotless airborne device can replace sensors and retrieve extinguished sensors for recycling. Such a device may have only a comparatively small load capacity, given the need for sensors replacement tooling and for mobility of the remote-controlled pilotless airborne device to approach a variety of different light fixtures and mounting structures. By way of additional example, a supply remote-controlled pilotless airborne device can have a large capacity, trading-off payload capacity, versatility and maneuverability.

In at least one embodiment of the invention, sensors are organized in a cartridge system, wherein an entire cartridge of new sensors can be transferred from a supply remote-controlled pilotless airborne device to a sensor replacement remote-controlled pilotless airborne device. For instance, in an example embodiment, a cartridge can receive extinguished sensors, while in another example embodiment, recycling is initiated in a remote-controlled pilotless airborne device by crushing the sensor, separating key materials to preserve transport capacity, and transferring crushed sensor matter to a supply remote-controlled pilotless airborne device.

Additionally, one or more embodiments of the invention include implementing the sensor-remote-controlled pilotless airborne devices 210 and the internet of things (IoT). For example, the remote-controlled pilotless airborne devices 210 can include a substantially hollow elongated rod member having a predetermined shape, size and length. An extendable member may be disposed within the elongated rod member, and a locking means can be used with the rod member and the extendable member for adjusting the length of the apparatus. In such an embodiment, a replaceable vacuum cup having a predetermined shape can be disposed on a first end of the extendable member for attachment to a sensor. Also, a vacuum pump can be disposed adjacent to a bottom portion of the rod member, with the pump engageable with the cup for creating a vacuum in the cup for securing a sensor within. A vacuum release means can additionally be disposed on the pump for releasing the vacuum.

Similarly, in another example embodiment of the invention, the remote-controlled pilotless airborne devices 210 can employ a long handle rod, a chuck at an upper end of the handle rod, and an operating mechanism at a lower end of the handle rod for actuating the chuck. The chuck can include an arm holder, bearing brackets, chuck arms pivotally supported by the bearing brackets, tension springs for closing the chuck arms, a seat pad for receiving and supporting a top surface of the sensor (or other shape), guide bars for opening the chuck arms, and a movable bar-holder-block connected to the operation mechanism for supporting the guide bars. In such an embodiment, when the movable bar-holder-block is pulled downward by the operating mechanism, the upper end portions of the chuck arms are operatively opened away from one another.

Alternatively, in yet another example embodiment of the invention, the sensor can be unscrewed and screwed in the sensor holder by an arm as described above that can hold and position the sensor (also screw and unscrew sensor). Further, the new sensor can (optionally) first be loosely positioned in a socket and tested, before being firmly attached.

The SDV sensor fault remedy system 205 in the FIG. 2 embodiment is assumed to be implemented using at least one processing device. Each such processing device generally comprises at least one processor and an associated memory, and implements one or more functional modules for controlling certain features of the SDV sensor fault remedy system 205.

More particularly, the SDV sensor fault remedy system 205 in this embodiment comprises a processor 220 coupled to a memory 222 and a network interface 224. The processor 220 illustratively comprises a microprocessor, a microcontroller, an application-specific integrated circuit (ASIC), a field-programmable gate array (FPGA) or other type of processing circuitry, as well as portions or combinations of such circuitry elements. The memory 222 illustratively comprises random access memory (RAM), read-only memory (ROM) or other types of memory, in any combination. The memory 222 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 224 allows the SDV sensor fault remedy system 205 to communicate over the network 204 with the SDVs 202 and the remote-controlled pilotless airborne devices 210, and illustratively comprises one or more conventional transceivers.

The processor 220 further comprises a sensor fault detector 230, a sensor fault remedy determination component 232, and a sensor fault remedy signal generator 234. It is to be appreciated that this particular arrangement of modules 230, 232, and 234 illustrated in the processor 220 of the FIG. 2 embodiment is presented by way of example only, and alternative arrangements can be used in other embodiments. For example, the functionality associated with the modules 230, 232, and 234 in other embodiments can be combined into a single module, or separated across a larger number of modules. As another example, multiple distinct processors can be used to implement different ones of the modules 230, 232, and 234 or portions thereof. At least portions of the sensor fault detector 230, sensor fault remedy determination component 232, and sensor fault remedy signal generator 234 may be implemented at least in part in the form of software that is stored in memory 222 and executed by processor 220.

It is to be understood that the particular set of elements shown in FIG. 2 for automatically detecting sensor faults involving SDVs 202 of computer network 200 and for automatically implementing remedial measures based on the detected sensor faults is presented by way of illustrative example only, and in other embodiments additional or alternative elements may be used. Thus, another embodiment may include additional or alternative systems, devices and other network entities, as well as different arrangements of modules and other components.

By way of example, in other embodiments, the SDV sensor fault remedy system 205 can be eliminated and associated elements such as sensor fault detector 230, sensor fault remedy determination component 232, and sensor fault remedy signal generator 234 can be implemented elsewhere in the computer network 200.

An exemplary process utilizing sensor fault detector 230, sensor fault remedy determination component 232, and sensor fault remedy signal generator 234 of the SDV sensor fault remedy system 205 in computer network 200 will be described in more detail below (as well as in connection to the flow diagram of FIG. 3).

The SDV fault remedy system 205 can monitor and detect (via component 230) at least one fault from sensor failure, which may include the sensor being obscured by snow, mud, etc. Additionally, the triggering of a remedial action (carried out via the determination made by component 232 and the corresponding signal generated by component 234) can be based, for example, on an estimated tolerance for or the risk of the sensor fault being dangerous to a passenger, the vehicle, a pedestrian, etc. The remedial action can include, for example, changing from an SDV mode to a human-operated mode for the vehicle, and/or directing the SDV to change its route and/or location to secure resources to resolve the fault or reduce risk. Such decisions can be based on learning the current and predicted context of the SDV (for example, the amount of time required for the remote-controlled pilotless airborne device, other SDV, and/or human mechanic to arrive).

Additionally, the remedial action can include transporting the passengers to a safe location (via the remote-controlled pilotless airborne device calling another SDV) and leaving the incapacitated SDV for further assistance and/or action. Such decisions can take into account the passable width of the relevant road(s), the width of any relevant and available shoulders, as well as the threat posed by going beyond a passable road (for example, colliding with cars going in an opposite direction). The SDV may include knowledge of a road map and traffic forecasts, which can be learned from data collected by other SDVs, and/or using IoT capabilities. Also, a remedial action can include cleaning or deicing a sensor (for example, performed by the SDV itself, by a remote-controlled pilotless airborne device companion, or by a separate SDV).

Also, as detailed herein, a remote-controlled pilotless airborne device can be equipped to carry one or more sensors and one or more types of sensors (for example, sensors that are pre-loaded in a carousel), one or more mechanisms for estimating a desire, need, and/or/risk for a sensor replacement on an SDV, and one or more mechanisms for replacing an old sensor with a new sensor. Such a mechanism for replacing an old or damaged sensor with a new sensor can include a robotic arm that unloads or adds to a set of receptacles in the remote-controlled pilotless airborne device. Further, the remote-controlled pilotless airborne device can carry away the old sensor and/or transport the faulty part to where the part can be repaired.

The desire and/or need for sensor replacement can be based on detection of a sensor that is burned out, detection of a sensor with changing characteristics, a database that includes the age of a sensor and the time of last replacement of the sensor, a history of expected sensor lifetimes for a class of sensor, a risk assessment (for example, if not replaced, other dependent sensor(s) may fail, weather predictions indicate that heavy rain may come and visibility will be low), etc.

The desire and/or need for sensor replacement can also be based on an estimated need arising from an anticipated dangerous road intersections, etc. If the estimated need is of a temporary nature, a remote-controlled pilotless airborne device equipped with additional complementary sensors (which the SDV is not equipped with) can accompany the SDV until the SDV exits the sensitive area.

In one or more embodiments of the invention, a remote-controlled pilotless airborne device can learn about needs for replacement based on the history of the SDV or of a class of SDVs, as well as a history of requests for replacement (relating to an SDV or a class of SDVs). If desired, because sensors are prone to intermittent faults, the remote-controlled pilotless airborne device can additionally supply different sensors rather than duplicating the same sensor type because of diversity of reaction of different sensor types to the same environmental condition.

In at least one embodiment of the invention, determining sensor degradation can include obtaining sensor readings from a sensor of an autonomous vehicle and determining baseline state information from the obtained readings. A movement characteristic of the autonomous vehicle, such as speed or position, can then be changed based on the sensor degradation determination. The sensor can then obtain additional sensor readings, and a second set of state information can be determined from the additional sensor readings.

Expected state information can be determined from the baseline state information and the change in the movement characteristic of the autonomous vehicle. A comparison of the expected state information and the second state information can be performed, and based on this comparison, a determination can be made as to whether the sensor has degraded. By way of another example, a zigzag trajectory of the vehicle on a straight uncrowded road can indicate that one or more sensors (for example, one or more distance sensors) of the vehicle are malfunctioning.

As detailed herein, in one or more embodiments of the invention, a remedial action can include, for example a temporary measure and/or a measure that is only partly functional. Also, a remote-controlled pilotless airborne device can be configured to test and repair a particular sensor on an SDV. For example, a test by the remote-controlled pilotless airborne device can include a visual inspection (in which a crack is detected, for instance). The analysis, performed using a log analyzer, applied to the SDV's log traces (which contain logs of the failure information) stored in the SDV and/or in a cloud infrastructure, can be accessed by the remote-controlled pilotless airborne device before flying to the SDV.

A remedial action can also include the sending of a signal to a second SDV, instructing the second SDV to travel to the disabled SDV, establish a connection with the disabled SDV, and provide a sensor by proxy. For example, the second SDV may guide the disabled SDV, via a tether or by wireless means, for example, so as to supply the needed sensing information. Accordingly, in one or more embodiments of the invention, another suitable SDV can be called by the remote-controlled pilotless airborne device based on an analysis of the situation (faulty sensors, car conditions, etc.). The faulty SDV may utilize the data collected by other SDVs to aid its driving while waiting for the remote-controlled pilotless airborne device (or other SDVs) to arrive.

In parallel with sending a signal to a remote-controlled pilotless airborne device, a remedial action can also include the sending of a signal to human technical, mechanical and/or service individual, who may be dispatched to the disabled SDV to fix the failure. The decision to send a signal to a remote-controlled pilotless airborne device, other SDV, or human service provider can be based on a risk assessment (for example, a dangerous area and/or road may imply the need for a remote-controlled pilotless airborne device or a service person, depending on the SDV sensor involved), a cost-benefit analysis, a proximity analysis, etc. Also, a remedial action can be performed by the coordination of two or more remote-controlled pilotless airborne devices (or one remote-controlled pilotless airborne device and another SDV, etc.) based on their individual specializations.

Further, at least one embodiment of the invention can include implementing and/or utilizing a remote-controlled pilotless airborne device wireless sensor by proxy. In such an embodiment, a remedial action can include a remote-controlled pilotless airborne device connecting wirelessly to the SDV and allowing the SDV to access all of the sensors of the remote-controlled pilotless airborne device. Accordingly, in such an embodiment, the remote-controlled pilotless airborne device becomes passive hardware hosting the sensors for the SDV to control and use.

Figure 3:
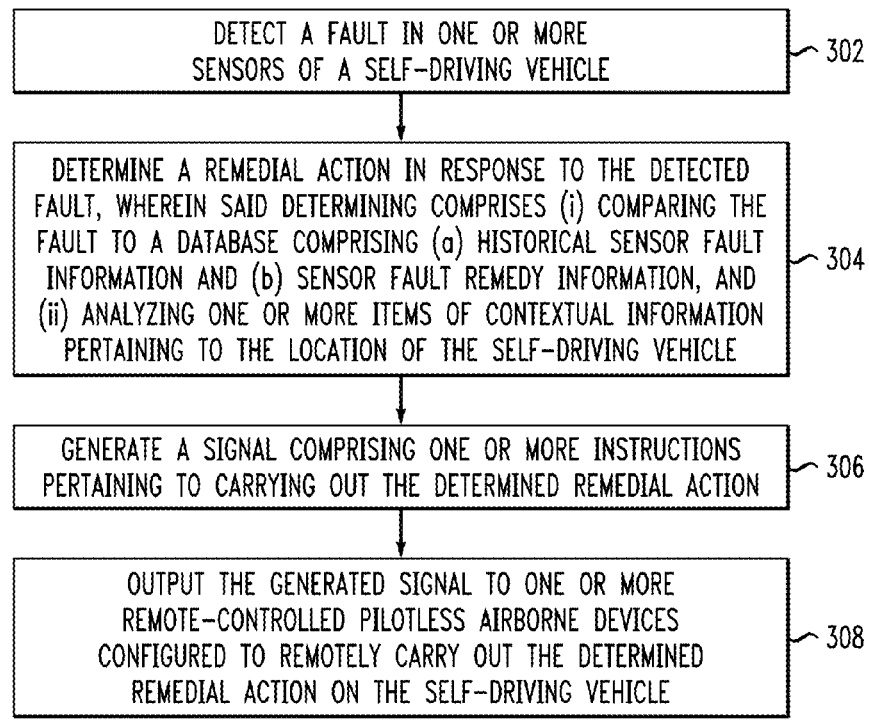
FIG. 3 is a flow diagram illustrating techniques according to an embodiment of the invention.

FIG. 3 is a flow diagram illustrating techniques according to an embodiment of the present invention. Step 302 includes detecting a fault in one or more sensors of a self-driving vehicle. The one or more sensors can include one or more LIDAR sensors, one or more radar sensors, one or more ultrasonic sensors, and/or one or more image sensors.

Step 304 includes determining a remedial action in response to the detected fault, wherein said determining comprises (i) comparing the fault to a database comprising (a) historical sensor fault information and (b) sensor fault remedy information, and (ii) analyzing one or more items of contextual information pertaining to the location of the self-driving vehicle. The determining step can further include generating an estimated risk associated with the detected fault being dangerous to the self-driving vehicle, a passenger of the self-driving vehicle, and/or a pedestrian proximate to the self-driving vehicle.

Also, the one or more items of contextual information can include the width of the road on which the self-driving vehicle is currently located, as well as weather-related information pertaining to the location of the self-driving vehicle. Further, the historical sensor fault information can include the age of the one or more sensors, the date of any previous replacements for the one or more sensors, and/or a history of expected sensor lifetimes for each of one or more classes of sensors.

Step 306 includes generating a signal comprising one or more instructions pertaining to carrying out the determined remedial action. The remedial action can include performing a diagnostic test on the one or more sensors, performing a repair of the one or more sensors, replacing the one or more sensors, cleaning the one or more sensors, deicing the one or more sensors, and/or providing a sensor by proxy to the self-driving vehicle. Additionally, the remedial action can include physically connecting the one or more remote-controlled pilotless airborne devices to the self-driving vehicle and/or wirelessly connecting the one or more remote-controlled pilotless airborne devices to the self-driving vehicle.

Additionally, the one or more instructions pertaining to carrying out the determined remedial action can include an instruction to switch the self-driving vehicle from self-driving mode to human-operated mode, as well as an instruction to alter the route of the self-driving vehicle.

Step 308 includes outputting the generated signal to one or more remote-controlled pilotless airborne devices configured to remotely carry out the determined remedial action on the self-driving vehicle. One or more embodiments of the invention can also include outputting one or more additional self-driving vehicles or a combination of (i) one or more remote-controlled pilotless airborne devices and (ii) one or more additional self-driving vehicles.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
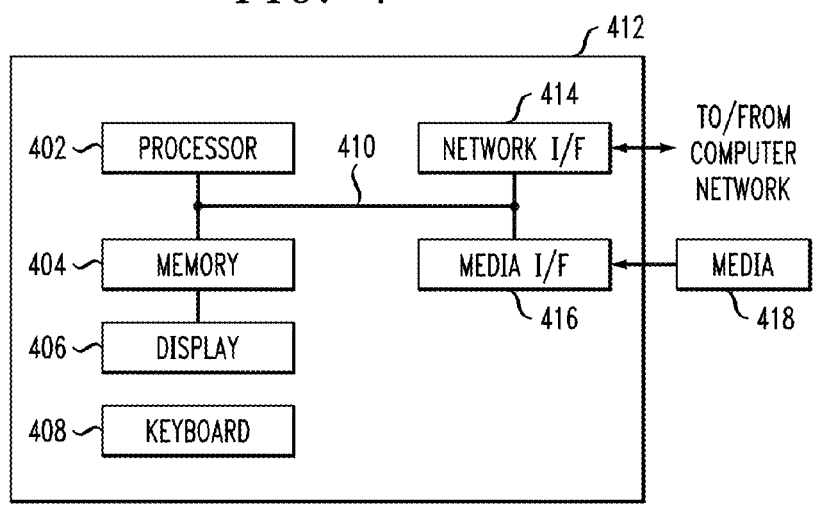
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein is not limited to a particular computing environment. Rather, embodiments of the present invention are capable of being implemented in conjunction with any other type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, based on the detection of one or more SDV sensor faults, automatically triggering a mobile amelioration action that employs a remote-controlled pilotless airborne device to implement the remedy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting a fault in one or more sensors of a self-driving vehicle;
   determining a remedial action in response to the detected fault, wherein said determining comprises (i) comparing the fault to a database comprising (a) historical sensor fault information and (b) sensor fault remedy information, (ii) analyzing one or more items of contextual information pertaining to the location of the self-driving vehicle, and (iii) generating an estimated risk associated with the detected fault being dangerous to at least one of the self-driving vehicle, a passenger of the self-driving vehicle, and a pedestrian proximate to the self-driving vehicle;
   generating a signal comprising one or more instructions pertaining to carrying out the determined remedial action; and
   outputting the generated signal to one or more remote-controlled pilotless airborne devices configured to remotely carry out the determined remedial action on the self-driving vehicle;
   wherein the steps are carried out by at least one computing device.

2. The computer-implemented method of claim 1, wherein the one or more sensors comprise one or more LIDAR sensors, one or more radar sensors, one or more ultrasonic sensors, and/or one or more image sensors.

3. The computer-implemented method of claim 1, wherein the remedial action comprises performing a diagnostic test on the one or more sensors.

4. The computer-implemented method of claim 1, wherein the remedial action comprises performing a repair of the one or more sensors.

5. The computer-implemented method of claim 1, wherein the remedial action comprises replacing the one or more sensors.

6. The computer-implemented method of claim 1, wherein the remedial action comprises cleaning the one or more sensors.

7. The computer-implemented method of claim 1, wherein the remedial action comprises deicing the one or more sensors.

8. The computer-implemented method of claim 1, wherein the remedial action comprises providing a sensor by proxy to the self-driving vehicle.

9. The computer-implemented method of claim 1, wherein the remedial action comprises physically connecting the one or more remote-controlled pilotless airborne devices to the self-driving vehicle.

10. The computer-implemented method of claim 1, wherein the remedial action comprises wirelessly connecting the one or more remote-controlled pilotless airborne devices to the self-driving vehicle.

11. The computer-implemented method of claim 1, wherein the one or more items of contextual information comprises the width of the road on which the self-driving vehicle is currently located.

12. The computer-implemented method of claim 1, wherein the one or more items of contextual information comprises weather-related information pertaining to the location of the self-driving vehicle.

13. The computer-implemented method of claim 1, wherein the historical sensor fault information comprises the age of the one or more sensors and/or the date of any previous replacements for the one or more sensors.

14. The computer-implemented method of claim 1, wherein the historical sensor fault information comprises a history of expected sensor lifetimes for each of one or more classes of sensors.

15. The computer-implemented method of claim 1, wherein the one or more instructions pertaining to carrying out the determined remedial action comprises an instruction to switch the self-driving vehicle from self-driving mode to human-operated mode.

16. The computer-implemented method of claim 1, wherein the one or more instructions pertaining to carrying out the determined remedial action comprises an instruction to alter the route of the self-driving vehicle.

17. A computer program product comprising a non-transitory computer readable storage medium having program instructions embodied therewith, the program instructions executable by a device to cause the device to:
  detect a fault in one or more sensors of a self-driving vehicle;
  determine a remedial action in response to the detected fault, wherein said determining comprises (i) comparing the fault to a database comprising (a) historical sensor fault information and (b) sensor fault remedy information, (ii) analyzing one or more items of contextual information pertaining to the location of the self-driving vehicle, and (iii) generating an estimated risk associated with the detected fault being dangerous to at least one of the self-driving vehicle, a passenger of the self-driving vehicle, and a pedestrian proximate to the self-driving vehicle;
  generate a signal comprising one or more instructions pertaining to carrying out the determined remedial action; and
  output the generated signal to one or more remote-controlled pilotless airborne devices configured to remotely carry out the determined remedial action on the self-driving vehicle.

18. The computer program product of claim 17, wherein said determining further comprises generating an estimated risk associated with the detected fault being dangerous to the self-driving vehicle, a passenger of the self-driving vehicle, and/or a pedestrian proximate to the self-driving vehicle.

19. A system comprising:
  a memory; and
  at least one processor coupled to the memory and configured for:
    detecting a fault in one or more sensors of a self-driving vehicle;
    determining a remedial action in response to the detected fault, wherein said determining comprises (i) comparing the fault to a database comprising (a) historical sensor fault information and (b) sensor fault remedy information, (ii) analyzing one or more items of contextual information pertaining to the location of the self-driving vehicle, and (iii) generating an estimated risk associated with the detected fault being dangerous to at least one of the self-driving vehicle, a passenger of the self-driving vehicle, and a pedestrian proximate to the self-driving vehicle;
    generating a signal comprising one or more instructions pertaining to carrying out the determined remedial action; and
    outputting the generated signal to one or more remote-controlled pilotless airborne devices configured to remotely carry out the determined remedial action on the self-driving vehicle.

* * * * *